United States Patent Office 3,464,836
Patented Sept. 2, 1969

3,464,836
CERAMIC FILAMENT, ELECTRICAL APPARATUS MADE THEREWITH AND METHOD OF MAKING SAME
Wesley W. Pendleton and George W. Ostrander, Muskegon, Mich., assignors to Anaconda Wire and Cable Company, a corporation of Delaware
Filed Nov. 2, 1964, Ser. No. 408,125
Int. Cl. C04b *35/00;* C03c *3/04*
U.S. Cl. 106—39         8 Claims

ABSTRACT OF THE DISCLOSURE

In the manufacture of magnet wire with glass-fiber insulation the fibers are drawn from a crystallizable composition which is subsequently heat-treated to form ceramic fibers in situ, said ceramic fibers having at least fifteen weight percent BaO and at least fifty weight percent of crystals of either spodumene, jadeite, or benitoite.

---

Our invention relates to a crystallized glass or ceramic filament and to an electrical apparatus incorporating the same, and particularly to such apparatus wherein the glass is crystallized after the formation of said apparatus.

It has long been known to make a useful fiber from a glass composition by pulling filaments at high speed from the molten glass. It has been further known to insulate electrical apparatus with glass fibers so made, such as by wrapping the fibers directly around electrical conductors or by forming them into fabric tapes which are then wrapped or otherwise positioned adjacent to conducting surfaces to serve as electrical insulation.

More recently it has also been known to transform glass having a suitable composition, from an amorphous vitreous material to a crystallized ceramic material having far greater strength and a much higher softening point. This is done by dissolving into the molten glass a nucleating agent such as $TiO_2$ which, upon the proper cooling of glass of suitable composition, precipitates a fine dispersion of nuclei around which ceramic crystals subsequently grow from the glass matrix. Ideally, if the composition of the glass is properly selected, virtually all the vitreous material will transform to the crystallized state when the nucleated glass is slowly reheated.

However, no known composition, suitable for the commercial production of glass fibers, is also suitable for crystallizing into the ceramic form.

It is an object of our invention to form glass compositions capable of being drawn into fibers and subsequently crystallized.

It is a further object of our invention to form ceramic fibers having higher strengths and softening points and high insulation resistances than glass.

It is a further object of our invention to insulate electrical apparatus with ceramic fibers.

If a glass composition is to be drawn into fibers it is desirable that it have a high temperature range during which it is plastic.

We have found that barium glass compositions comprising constituents crystallizing into crystals of spodumene, jadeite or benitoite can be drawn into filaments by known techniques and subsequently these filaments can be crystallized to form ceramic filaments, which prior to our instant discovery, were not obtainable by any means. Spodumene is a crystalline form of $Li_2O \cdot Al_2O_3 \cdot 4SiO_2$; jadeite is a crystalline form of $Na_2O \cdot Al_2O_3 \cdot 4SiO_2$; and benitoite is a crystalline form of $BaO \cdot TiO_2 \cdot 3SiO_2$; barium trisilicate is $BaO \cdot 3SiO_2$.

This discovery makes available a filament that can be collected into fibers and woven or otherwise intermeshed such as by felting, braiding, and other known means to form a fabric having a higher melting point than any heretofore obtainable.

Our invention has a particular applicability to the insulation of electrical apparatus for high temperature service. In making such apparatus, such for example, as motors, transformers, and relay coils, the conductors can be wound directly, with the fibers formed from bundles of filaments of our invention or by individual filaments, or they can be insulated with fabric made from the filaments. Since the filamentary ceramic is less flexible than the glass was before crystallization, it is a feature of the method of our invention to apply the insulation to a conductor of our apparatus prior to crystallization but after nucleation of the glass, and then to heat the insulated conductor to a temperature and for a length of time sufficient to complete the crystallization and change the insulation from a vitreous to a ceramic material. However, in many cases it is entirely practicable to apply the fibrous insulation after it has been crystallized, and apparatus so insulated comes within the scope of our invention. When our new fibrous insulation is used in fabric form, it has particular application as slot and phase insulation and as electrical sleeving for leads and cables and may be coated with an organic enamel which will burn off during the crystallization of the glass at high temperature. Nucleated glass fibers of our invention may also be formed into laminates and crystallized before or after laminating.

Magnet wire for use in electrical apparatus may be served with the fibers of our invention. For purposes of storing and handling such wire the fiber-wrapped wire may be coated with an abrasion-resistant enamel which will later be burned off. It is further envisioned that this enamel may contain suspended fusible glass particles in the manner disclosed in application Ser. No. 173,115, assigned to the assignee of the present invention.

To form glass fibers in the form of crystalline structures of spodumene, jadeite, or benitoite, melts are formed having the composition of Examples I, II, and III, respectively.

|  | Example I | Example II | Example III |
|---|---|---|---|
| Parts by Weight: |  |  |  |
| BaO | 15–30 | 15–30 | 25–40 |
| $SiO_2$ | 24–40 | 30–50 | 30–50 |
| $Al_2O_3$ | 10–17 | 10–17 | 10–17 |
| $TiO_2$ | 10–18 | 10–18 | 15–20 |
| $Li_2O$ | 3–6 |  |  |
| $K_2O$ | 0–7* |  |  |
| $Na_2O$ | 0–7* | 7–10 |  |
| ZnO | 3–10 | 3–10 | 1–8 |
| CaO | 3–7 |  |  |

*Combined $K_2O$ and $Na_2O$ not to exceed 7 parts.

The preferred compositions correspond to those of Examples IV, V and VI which were found to have the properties tabulated below and to draw into fibers:

|  | Example IV | Example V | Example VI |
|---|---|---|---|
| Parts by Weight: |  |  |  |
| BaO | 24.2 | 18.4 | 30.6 |
| $SiO_2$ | 28.0 | 36.0 | 36.0 |
| $Al_2O_3$ | 13.4 | 15.3 | 10.0 |
| $TiO_2$ | 12.0 | 13.0 | 17.0 |
| $Li_2O$ | 5.8 |  |  |
| $K_2O$ | 3.6 |  |  |
| $Na_2O$ | 1.0 | 9.3 |  |
| ZnO | 7.0 | 8.0 | 6.4 |
| CaO | 5.0 |  |  |
| Melting Point, ° C.: |  |  |  |
| Vitreous | 850 | 900 | 1,050 |
| Crystallized fiber | 1,050 | 1,100 | 1,250 |
| Crystalline forms | Spodumene, anatase, barium, trisilicate | Jadeite, barium titanate | Benitoite |
| Percent crystallized (optimum) | 85 | 90 | 80 |
| Temperature of crystallization, ° C | 750 | 800 | 950 |

We have invented a ceramic filament comprising at least 15%, by weight, of BaO and comprising crystals selected from the group consisting of spodumene, jadeite, and benitoite. The filament comprising spodumene includes, also, crystals of barium trisilicate and anatase and may be 85%, but should be at least 50%, crystalline. This spodumene, barium trisilicate, anatase fiber may be drawn initally from a melt having the composition:

|  | Parts by weight |
|---|---|
| BaO | 15–30 |
| SiO | 24–40 |
| $Al_2O_3$ | 10–17 |
| $TiO_2$ | 10–18 |
| $Li_2O$ | 3–6 |
| $Na_2O+K_2O$ | 0–7 |
| ZnO | 3–10 |
| CaO | 3–7 | and more preferably, the composition:

|  | Parts by weight |
|---|---|
| BaO | 24.2 |
| $SiO_2$ | 28.0 |
| $Al_2O_3$ | 13.4 |
| $TiO_2$ | 12.0 |
| $Li_2O$ | 5.8 |
| $K_2O$ | 3.6 |
| $Na_2O$ | 1.0 |
| ZnO | 7.0 |
| CaO | 5.0 |

The filament comprising jadeite includes, also, crystals of barium titanate, and may be 90% crystaline, but should be at least 50% crystalline. This filament is drawn from a melt with the composition:

|  | Parts by weight |
|---|---|
| BaO | 15–30 |
| $SiO_2$ | 30–50 |
| $Al_2O_3$ | 10–17 |
| $TiO_2$ | 10–18 |
| $Na_2O$ | 7–10 |
| ZnO | 3–10 | and preferably, the composition:

|  | Parts by weight |
|---|---|
| BaO | 18.4 |
| $SiO_2$ | 36.0 |
| $Al_2O_3$ | 15.3 |
| $TiO_2$ | 13.0 |
| $Na_2O$ | 9.3 |
| ZnO | 8.0 |

The filament comprising benitoite may have as high a proportion as 80% of this crystal with no other crystalline material, but there should be at least 50% benitoite. The benitoite crystal is drawn from a melt of the composition:

|  | Parts by weight |
|---|---|
| BaO | 25–40 |
| $SiO_2$ | 30–50 |
| $Al_2O_3$ | 10–17 |
| $TiO_2$ | 15–20 |
| ZnO | 1–8 | and preferably from a composition:

|  | Parts by weight |
|---|---|
| BaO | 30.6 |
| $SiO_2$ | 36.0 |
| $Al_2O_3$ | 10.0 |
| $TiO_2$ | 17 |
| ZnO | 6.4 |

A plurality of filaments may be combined in a known manner to form a fiber and this fiber may be woven or otherwise treated to form a textile fabric. The fibers may, either directly or after forming into a fabric, be used as electrical insulation wherein it will have the advantage of a higher softening point, tensile strength and insulation resistance than vitreous glass compositions. We have, therefore, invented electrical apparatus comprising a metallic conductor and a plurality of ceramic fibers insulating the conductor. These fibers are the fibers that have been described hereinabove and comprise at least 50% of crystals of spodumene, anatase and barium trisilicate; or jadeite and barium titanate; or benitoite.

There is an advantage in applying the fibers of our invention to electrical apparatus before it has been crystallized in that the filaments are more flexible in the vitreous state, and we have invented the method of making electrical apparatus comprising steps of melting a fiber-forming glass composition capable of forming ceramic crystals, drawing a plurality of filaments from the composition and cooling the filaments, at the same time nucleating the glass. We then insulate an electric conductor that comprises an element of our apparatus with the nucleated filaments and heat them to a temperature sufficient to crystallize the glass around the nuclei formed therein. For our ceramic comprising spodumene this temperature is about 750° C. For our composition comprising jadeite this temperature is about 800° C. and for our ceramic comprising benitoite the temperature is about 950° C. For this latter ceramic, copper conductors cannot be used if the heating process also involves raising the conductor to the crystallization temperature, but molybdenum and platinum conductors are quite suitable, as are a number of known alloys of these metals. Two hours are sufficient to complete the crystallization of each of our compositions and when copper conductors are used the crystallization may be performed in an inert atmosphere or under vacuum or the copper may be clad with nickel or other suitable oxidation-resistant substance. In our method the filaments are maintained at an elevated temperature for a sufficient time to crystallize at least 50% of said composition.

A more thorough understanding of our invention may be gained from the study of the appended drawing.

Figure 1:
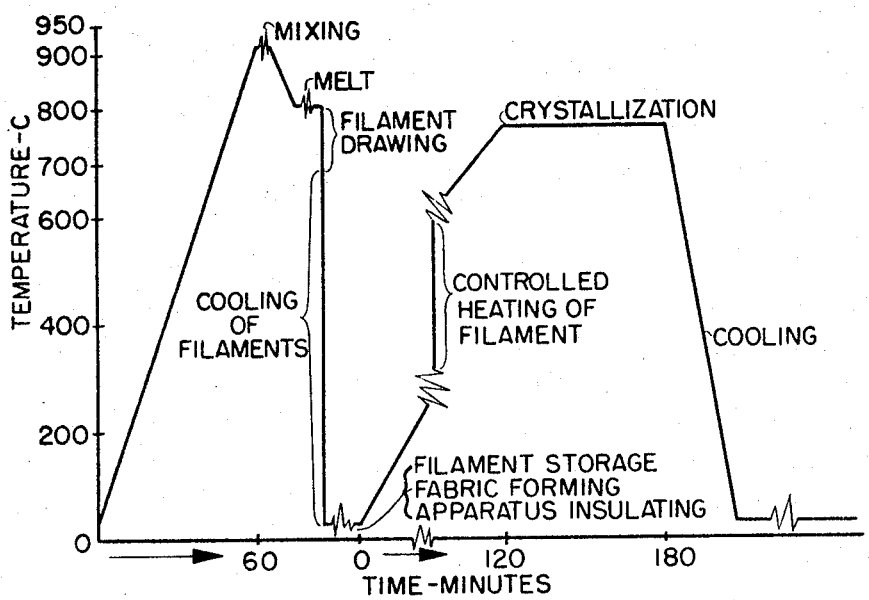
FIGURE 1 shows a time-temperature diagram of the preferred composition of our invention shown in Example IV.

A glass melt was prepared having the composition of Example IV and fibers were drawn from the melt at a temperature of about 800° C. Methods of drawing glass fibers are well known. These include contacting the molten glass with a cool rod and withdrawing the rod rapidly to draw out the glass adhering to it. The diameter of the filament drawn by this method can be regulated by varying the speed at which the rod is withdrawn from the melt. In the usual commercial practice the melt is contained on a platinum plate which has many small orifices through it. The plate is heated to the working temperature of the glass and when the melted glass appears on the underside of the plate filaments are drawn from each of the orifices, the filaments from a plurality of orifices being combined, after they are sufficiently cooled, to form a fiber. It is known, also, to draw filaments by ejecting molten glass at high speed with gas jets. From this description of the methods of drawing glass fibers it will be apparent that all glass compositions will not be suitable for the drawing of fibers but that it is necessary to have a composition with a wide temperature range of working. It is a feature of the composition of Example IV that fibers can be drawn over a range from 675° C. to 950° C.

Referring to FIGURE 1 a glass batch having the composition of Example I is brought to the molten state at about 925° C. and held for a period of time sufficient to assure batch homogeneity. This period will vary with the batch size and does not constitute a novel feature of the instant invention. The batch is then permitted to cool to about 800° C. and is maintained at that temperature for the withdrawal of filaments. We have found that filaments can be drawn from our glass composition over a wide temperature range extending from about 675–950° C. and the selection, within the scope of our invention, of a suitable melt temperature will depend upon the method of filament drawing selected from known methods and upon the filament diameter desired. As the filaments cool they continue to draw down until they have cooled to a temperature of 650°–675° C. and they cool rapidly thereafter to room temperature. During this rapid cooling period the TiO₂ nuclei are formed within the glass composition but the filaments themselves are uncrystallized glass and not ceramic. In this stage even fairly coarse filaments have flexibility sufficient for fabric forming on textile handling equipment and the filaments may be collected into yarn fibers or spun and stored as desired. In one embodiment of our invention the uncrystallized glass filaments are applied to apparatus at this stage but it is also within the scope of our invention to crystallize the filaments or fibers before they are applied to any apparatus or to crystallize them in the form of a free fabric. Reheating is done slowly, particularly where, in the case of yarn fibers or fabric, it is desired not to cause any adhesion of filaments to each other. When electrical conductors are heated to crystallize filaments that are permanently supported in place, the reheating can proceed more rapidly since a temporary softening of the fibers will not be objectionable. After the filaments have been heated to a temperature of about 750° C., they are maintained at that temperature for an hour to complete the crystallization and transformation to a ceramic state of the glass filaments. Thereafter cooling can be accomplished in any known convenient manner.

The compositions of Examples V and VI were drawn into fibers and crystallized in the manner of FIGURE 1 except that fibers were drawn at 850° and 1000° C., respectively, and crystallization was accomplished, respectively, at 800° and at 950° C.

Figure 2:
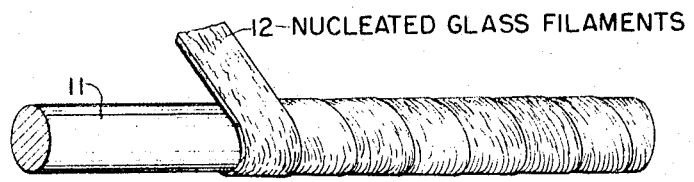
FIGURE 2 shows a magnet wire insulated in accordance with our invention.
Figure 3:
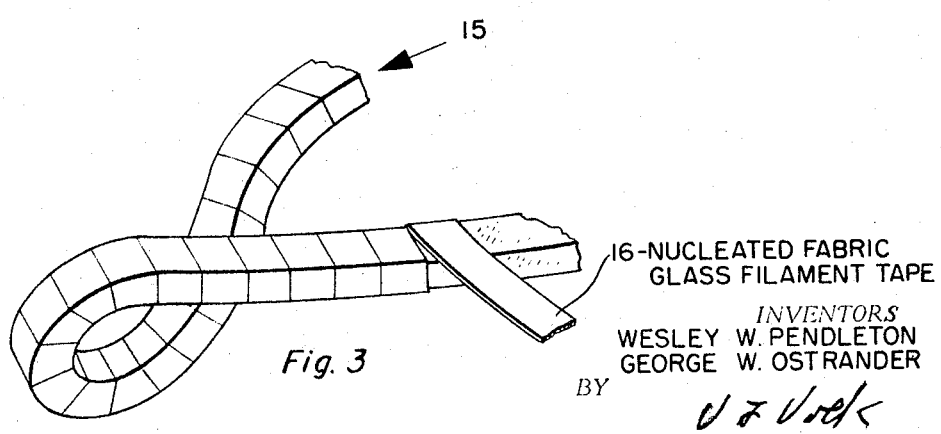
FIGURE 3 shows a coil insulated with fabric tape in accordance with our invention.

In FIGURE 2 a conductor 11 has been insulated by winding it with a plurality of nucleated glass filaments 12, and in FIGURE 3 a portion of an armature coil 15 has been wrapped for electrical insulation with a tape woven of glass fibers formed of filaments from a glass composition of our invention. It will be understood that the filaments 12 and fabric 16 may be lubricated with organic binders such as starch in the known manner of treating glass fibers against abrasion and may also be coated with varnish or enamel. In order to change the glass to a ceramic the wire 11 and coil 15 are heated to the crystallization point of the glass and maintained at the elevated temperature, preferably for at least one hour. To avoid oxidation of the underlying metallic conductor the crystallization may be performed under vacuum or in an inert atmosphere. Since, however, the principal application of the insulation of our invention is for high temperature service, it is most likely that the conductors within the coil 15 and the conductor wire 11 will comprise nickel-covered copper or other material resistant to degradation at the temperature of crystallization.

We have invented a new composition, electrical apparatus and method of making said apparatus for which we desire an award of letters patent.

We claim:

1. A ceramic filament consisting essentially of a glass matrix and at least fifty weight percent of crystals selected from the groups consisting of spodumene, jadeite, and benitoite and having at least fifteen weight percent of BaO, said glass matrix consisting essentially of glass remaining uncrystallized after formation of said crystals.

2. A ceramic filament consisting essentially of a glass matrix and at least fifty weight percent of crystals of spodumene, anatase and barium trisilicate and having at least fifteen weight percent BaO, said glass matrix consisting essentially of glass remaining uncrystallized after formation of said crystals.

3. A ceramic filament consisting essentially of a glass matrix and at least fifty weight percent of crystals of jadeite and barium titanate and having at least fifteen weight percent BaO, said glass matrix consisting essentially of glass remaining uncrystallized after formation of said crystals.

4. A ceramic filament consisting essentially of a glass matrix and at least fifty weight percent of benitoite crystals and having at least fifteen weight percent BaO, said glass matrix consisting essentially of glass remaining uncrystallized after formation of said crystals.

5. A textile fabric comprising the filaments of claim 1.
6. A textile fabric comprising the filaments of claim 2.
7. A textile fabric comprising the filaments of claim 3.
8. A textile fabric comprising the filaments of claim 4.

References Cited

UNITED STATES PATENTS 2,920,971    1/1960    Stookey _____ 106—39

TOBIAS E. LEVOW, Primary Examiner

R. D. EDMONDS, Assistant Examiner

U.S. Cl. X.R.

106—50, 52